US012661762B2

(12) United States Patent
Pyddoke

(10) Patent No.: US 12,661,762 B2
(45) Date of Patent: Jun. 23, 2026

(54) POWER TOOL COMPRISING A HYDRAULIC PULSE UNIT

(71) Applicant: ATLAS COPCO INDUSTRIAL TECHNIQUE AB, Stockholm (SE)

(72) Inventor: Thomas Pyddoke, Lidingö (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/712,376

(22) PCT Filed: Nov. 1, 2022

(86) PCT No.: PCT/EP2022/080418
§ 371 (c)(1),
(2) Date: Jul. 9, 2024

(87) PCT Pub. No.: WO2023/094118
PCT Pub. Date: Jun. 1, 2023

(65) Prior Publication Data

US 2024/0326204 A1 Oct. 3, 2024

(30) Foreign Application Priority Data

Nov. 29, 2021 (SE) .................................... 2130333-4

(51) Int. Cl.
*B25B 21/02* (2006.01)
*B25F 5/00* (2006.01)

(52) U.S. Cl.
CPC .............. *B25B 21/02* (2013.01); *B25F 5/005* (2013.01)

(58) Field of Classification Search
CPC ...... B25B 21/02; B25B 23/1453; B25F 5/005
See application file for complete search history.

(56) References Cited

U.S. PATENT DOCUMENTS 2,373,665 A * 4/1945 Emery .................... B25B 21/02 192/113.33
3,214,940 A * 11/1965 Kramer ............... B25B 23/1453 192/58.92

(Continued)

FOREIGN PATENT DOCUMENTS

CA 2233073 A1 4/1997
EP 105038 A1 4/1984

(Continued)

OTHER PUBLICATIONS

Atlas Copco Industrial Technique AB, International Patent Application No. PCT/EP2022/080418, International Search Report, Jan. 24, 2023.

(Continued)

*Primary Examiner* — Shelley M Self
*Assistant Examiner* — Katie L Gerth
(74) *Attorney, Agent, or Firm* — Moore & Van Allen PLLC; W. Kevin Ransom

(57) ABSTRACT

Provided is an impulse tool including a motor, an output shaft, and a hydraulic pulse unit including an inertia drive member connected to the motor and rotatable about a rotation axis, an oil chamber enclosed in the inertia drive member and an impulse generating means arranged to transfer intermittently kinetic energy to the output shaft. The inertia drive member further includes an end piece having a transverse wall and a disc shaped element arranged to at least partly delimit a receiving space in fluid communication with the oil chamber. Formed between the disc shaped element and the transverse wall and a compressible insert arranged in fluidic communication with the receiving space. The compressible insert includes a foam body including a closed cell foam, and wherein the compressible insert is arranged in an insert space formed in the end piece.

19 Claims, 3 Drawing Sheets

(56) References Cited

U.S. PATENT DOCUMENTS

| | | | | | |
|---|---|---|---|---|---|
| 4,175,408 | A * | 11/1979 | Kasai | B25B 23/1453 464/25 |
| 4,533,337 | A * | 8/1985 | Schoeps | B25B 21/026 464/25 |
| 5,132,171 | A * | 7/1992 | Yoshizawa | C09K 21/14 428/317.1 |
| 5,472,537 | A * | 12/1995 | Friel | B01D 29/111 156/308.2 |
| 6,110,045 | A | 8/2000 | Schoeps | |
| 9,259,826 | B2 | 2/2016 | Söderlund | |
| 10,751,861 | B2 * | 8/2020 | Söderlund | B25B 21/026 |
| 12,447,588 | B2 * | 10/2025 | Opsitos, Jr. | B25B 21/023 |
| 2013/0056237 | A1 * | 3/2013 | Soderlund | B25B 21/02 173/218 |
| 2019/0314768 | A1 * | 10/2019 | Kimura | B01D 67/0088 |
| 2022/0048167 | A1 * | 2/2022 | Sjosten | B25B 21/026 |
| 2023/0191567 | A1 * | 6/2023 | Opsitos, Jr. | B25B 21/023 81/464 |

FOREIGN PATENT DOCUMENTS

| | | | |
|---|---|---|---|
| GB | 2231292 | A | 11/1990 |
| GB | 2240500 | A | 8/1991 |
| WO | 2020053000 | A1 | 3/2020 |

OTHER PUBLICATIONS

Atlas Copco Industrial Technique AB, International Patent Application No. PCT/EP2022/080418, Written Opinion, Jan. 24, 2023.

Atlas Copco Industrial Technique AB, International Patent Application No. PCT/EP2022/080418, International Preliminary Report on Patentability, Nov. 28, 2023.

Atlas Copco Industrial Technique AB, Swedish Patent Application No. 2130333-4, Office Action, May 11, 2022.

* cited by examiner

POWER TOOL COMPRISING A HYDRAULIC PULSE UNIT

CROSS-REFERENCE TO RELATED APPLICATIONS

This application is a National Stage Patent Application (filed under 35 § U.S.C. 371) of PCT/EP2022/080418, filed Nov. 1, 2022 of the same title, which, in turn claims priority to Swedish Patent Application No. 2130333-4 filed Nov. 29, 2021 of the same title; the contents of each of which are hereby incorporated by reference.

TECHNICAL FIELD

The present invention generally relates to power tools for tightening of screws, more particularly to impulse type power tools having a hydraulic pulse unit and a compressible insert arranged in this unit.

TECHNICAL BACKGROUND

Power tools for tightening are known to be used in various industries. For example, power tools of the impulse type comprising hydraulic pulse units are commonly used for continuous heavy production.

The hydraulic unit of such tools is filled with oil. These units however need to be designed to accommodate for heat expansion of the oil as the oil heats up during operation. Solutions have been proposed wherein a small amount of air is introduced in the oil in order to absorb this heat expansion. In power tools of this type however, known problems include filling of the pulse unit with an exactly correct amount of oil such that there will be air enough left inside the pulse unit to absorb the expansion of the oil.

In order to alleviate some of these problems, attempts have been made to provide an air volume arranged in communication with the oil chamber in order to accommodate for the heat expansion. For example, as the oil expands a small amount of oil may be allowed to escape into such an air space hence causing the air in the space to compress and as the pulse unit cools down, the oil is sucked back into the oil chamber. However, as the oil is sucked back, there is a risk of air from the air volume being introduced into the oil chamber, causing impaired efficiency.

Another solution proposed involves using elastic elements to compensate for heat related expansions, which allows for that the pulse units can be filled up completely without leaving any air in the oil volume.

However, there are still problems remaining in that such elastic elements tend to suffer from remaining deformation, allowing for air to enter the chamber causing impaired efficiency, and further often result in a more bulky and complex design and/or affect the inertia and hence operation of the pulse unit negatively.

Hence, there exists a need for improvement in the field of power tools comprising hydraulic pulse units.

SUMMARY OF THE INVENTION

Accordingly, it would be desirable to provide an impulse tool where the measures for ensuring a low percentage of air in the oil volume are more efficient. In particular, it would be desirable to provide an impulse tool where such measures are provided in a manner not affecting the operation of the pulse unit and the complexity of the tool. To better address one or more of these concerns an impulse tool comprising a compressible insert as defined in the independent claims is provided. Preferred embodiments are defined in the dependent claims.

According to a first aspect of the invention an impulse tool is provided comprising a motor, an output shaft, and a hydraulic pulse unit including an inertia drive member connected to the motor and rotatable about a rotation axis, an oil chamber enclosed in the inertia drive member and an impulse generating means arranged to transfer intermittently kinetic energy to the output shaft, wherein the inertia drive member further comprises an end piece having a transverse wall, the impulse tool further comprising a disc shaped element arranged to at least partly delimit a receiving space in fluid communication with the oil chamber, formed between the disc shaped element and the transverse wall. Wherein the impulse tool further comprises a compressible insert arranged in fluidic communication with the receiving space, wherein the compressible insert comprises a foam body comprising a closed cell foam, and wherein the compressible insert is arranged in an insert space formed in the end piece.

According to the first aspect, the impulse tool (or power tool or tightening tool, these terms are used interchangeably throughout the present specification) provides an inventive solution to the concerns described above by means of a design incorporating a compressible insert. More particularly, the design ensures a proper functionality of the compressible insert by allowing for a comparably larger insert able to accommodate for the thermal expansion of the oil by means of elastic deformation only—i.e. without permanent deformation, and without compromising the efficiency of the pulse unit, as will be described in the following.

The inventive compressible insert is made from a closed cell foam material—i.e. a material having isolated air bubbles ensuring that the air is contained in the insert and does not interfere with the operation of the pulse unit and accordingly the performance of the power tool may be significantly improved. The compressible insert may either be formed by a single uniform foam body or comprise one or more separate foam bodies joined together. The insert may further comprise an outer skin enclosing the foam.

The compressible insert is further adapted to be arranged in the pulse unit during assembly, before filling the unit with oil. In a resting, i.e. cool state, of the tool the compressible insert in its unstressed state and the oil thus fills the inner space of the unit. During operation of the impulse unit, as the oil heats up, expansion occurs resulting in compression of the compressible insert in the adjacent insert space. As the tool halts however, the oil is cooled again and the compressible insert may expand back to its uncompressed state.

The disc shaped separator element separates the oil chamber from a receiving space and may in some embodiments comprise an opening through which oil may flow between the oil chamber and the receiving space providing the fluid communication. This provision of a separate receiving space with which the compressible insert is arranged in fluidic communication is advantageous in that the compressible insert is shielded from fast fluctuations in pressure (as opposed to the slower variations of the temperature). By shielding the insert from the fast fluctuations, fatigue life may be improved. The compressible element may hence in some embodiments be described as arranged in a chamber separate from the main oil chamber, in some embodiments connected via a fluid opening or orifice, where such an orifice will contribute further to dampen quick pressure variations. By disc shape should be understood a structure having a substantially circular circumference and a thickness considerably smaller than the diameter, but not necessarily a completely flat surface.

The referenced impulse tool may be a handheld pneumatic impulse tool or an electrical tool, for example a battery powered tool.

According to one embodiment, the insert space is arranged adjacent to the receiving space. This allows for the oil to act directly on the insert when expanding, and for the insert to be arranged outside of the oil chamber and thus minimizing impact on the pulse unit.

According to one embodiment, the insert space extends in an axial direction from the receiving space over at least ⅔ of the length of the end piece. In one embodiment, the insert space extends between the receiving space and an opposite end wall of the end piece. A longer design allows for a smaller radius and thus less impact on inertia.

In some embodiments, the compressible insert extends along the total length of the insert space. According to one embodiment, an outer boundary surface of the compressible insert and the insert space are congruent, such that the compressible insert in an uncompressed state fills the whole insert space. Hereby, an efficient utilization of space is achieved.

The shape of the inventive compressible insert (and/or the insert space) may preferably be chosen to minimize the impact on the strength and operation of the pulse unit. More particularly, chosen to not affect material which is subjected to high stress and/or contributes significantly to the moment of inertia. This may be achieved for example by keeping the radius as small as possible. In some embodiments, the element is further designed to have an elongated shape where the axial length of the element is larger than the radius. The length may for example be at least twice the radius. The insert may further be rotational symmetric.

According to one embodiment, the compressible insert is rotationally symmetric with respect to a center axis A-A of the pulse unit and wherein a radius R1 of the compressible is less or equal than half of a radius R2 of the end piece along the length of the insert chamber. Rotationally symmetric refers to the overall shape of the element, disregarding for example slits for facilitating mounting and the like.

According to one embodiment, the at least one of the radius R1 of the compressible insert and the varying radius R2 of the end piece is/are varying along the length of the insert chamber.

According to one embodiment, the insert space extends between the receiving space and an oil inlet formed in the end piece and wherein an oil channel is formed in the compressible insert forming a fluid path fluidly connecting the receiving space and the oil inlet. Hereby a flow of oil is allowed to pass through a portion of the insert, facilitating filling of the pulse unit after the insert is arranged in the unit.

According to one embodiment, the oil channel is an oil channel for filling the pulse unit extending along a center axis of the compressible insert. Such an oil inlet may be an inlet formed at an opposite end wall of the end piece.

According to one embodiment, the oil channel is an oil channel for filling the pulse unit extending in a direction perpendicular to a center axis of the compressible insert. Such an oil inlet may be an inlet formed at a side wall of the end piece.

The volume of the insert may preferably be chosen to be sufficiently larger to ensure elastic deformation only, this may depend on the material used for the foam as well as the properties of the oil used in the pulse unit. In any case, the respective volumes should preferably be chosen so that a thermal expansion of the oil corresponds to a suitable level of compression of the insert—by suitable could in some embodiments be understood a level allowing for elastic deformation only, i.e. no permanent deformation of the insert should arise, or a small permanent deformation only.

For example, according to one embodiment, the volume $V_f$ of the insert lies in the range 10-30% of a combined total volume V of the oil chamber and the receiving space. The total volume V hence being equivalent to the total volume of oil filled to the pulse unit in use.

According to one embodiment, the volume $V_f$ of the insert lies in the range 10-25% of the combined total volume V, preferably 10-20%, more pref. 10-15%.

The material of the foam body should preferably be resistant to oil, be able to withstand high temperatures and be able to withstand fatigue damage.

According to one embodiment, the closed cell foam is a foam material which can withstand 20-50% compression without permanent deformation, preferably 20-30%, more preferably 22-27% deformation.

According to one embodiment, the cell diameter of the closed cell foam lies in the range 0.15-0.35 mm, preferably 0.2-0.3 mm, more preferably 0.25-0.28 mm.

According to one embodiment, the gas fraction of the cell foam lies in the range 85-99%.

A correctly chosen cell diameter as well as gas fraction of the foam is important to ensure proper elastic behavior of the compressible insert.

According to one embodiment, the closed cell foam is made of polyvinyl fluoride. Other examples include for example silicon rubber.

According to a second aspect of the present invention, a compressible insert adapted to be arranged in an impulse tool according to any of the embodiments described above is provided. Objectives, advantages and features of the compressible insert conceivable within the scope of the second aspect of the invention are readily understood by the foregoing discussion referring to the first aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
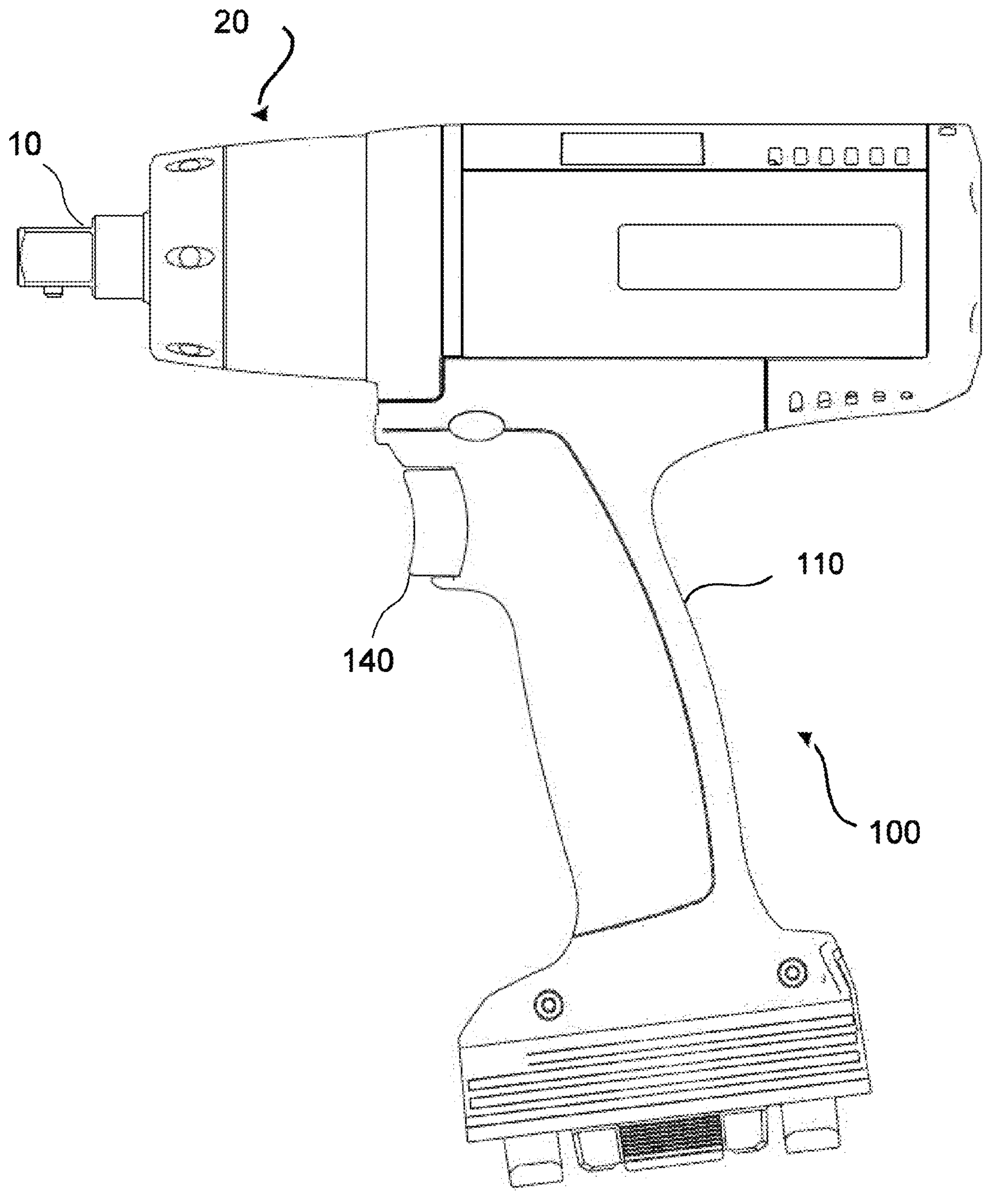
FIG. 1 is a side view of an exemplary power tool according to one embodiment

The exemplary impulse tool shown in FIG. 1 is a pistol type tool which comprises a housing 100 with a handle 110. For power control, the tool is provided with a trigger button 140. In the housing there is further provided a non-illustrated motor, and a hydraulic pulse unit 20 with a square ended output shaft 10.

Figure 2A:
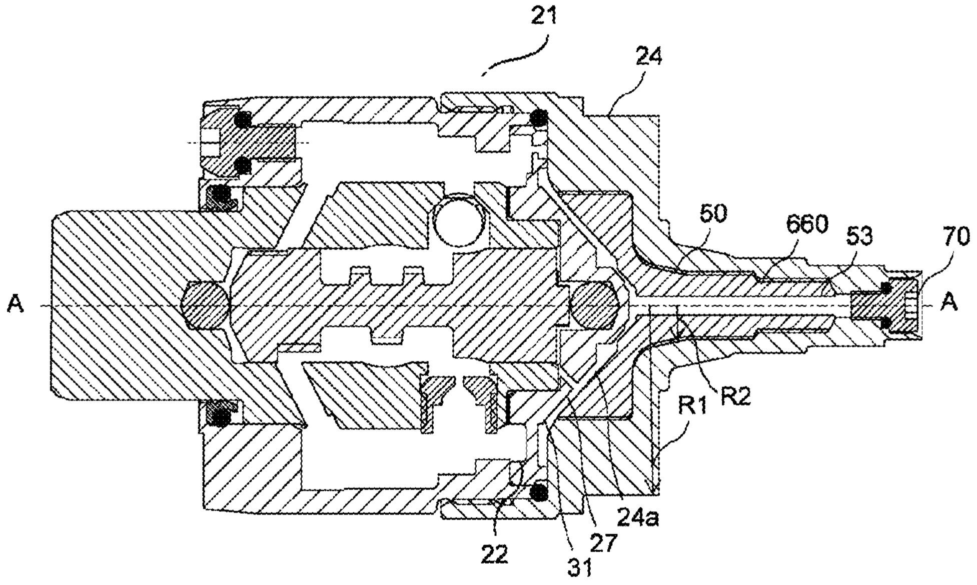
FIG. 2*a* is a cross sectional view of a hydraulic pulse unit according to one embodiment.

As illustrated in FIGS. 2*a* (and 3*a*) the impulse unit comprises an inertia drive member 21 connectable to the motor and rotatable about a rotation axis (A-A) and enclosing an oil chamber 22. The inertia drive member 21 comprises a rear part 24, or end piece 24, which is adapted to be connected to the motor. The output shaft 10 has an impulse receiving portion which extends into the oil chamber 22 and is intermittently coupled to the drive member 21 via an impulse generating mechanism. The operation of the impulse mechanism per se is not described in any further detail since it is known in the art. Similar mechanisms has been previously described for example in U.S. Pat. Nos. 6,110,045 and 13,697,107.

A disc shaped element 31 delimits a receiving space 27 formed between the element 31 and a transverse wall 24*a* of the end piece 24. The receiving space 27 is in fluid communication with the oil chamber 22 (for example by means of a fluid opening provided in the disc shaped element, not shown), and may be described as a chamber into which oil may flow from the oil chamber 22 when heat expansion occurs.

In the illustrated embodiment, an insert space 60 is arranged adjacent to the receiving space 27, and a compressible insert 50 is arranged in this insert space 60. The insert 50 is thus in fluidic communication with the oil in the pulse unit, i.e. the oil acts on the compressible insert 50, for example during thermal expansion causing the compressible insert 50 to compress. In the illustrated embodiment, the insert space 60 extends in an axial direction from the receiving space 27 to an oil inlet 70 formed in the end piece.

The compressible insert in the illustrated embodiment, in an unstressed state, fills the whole insert space—i.e. an outer boundary surface of the compressible insert 50 and the insert space 60 are congruent. Further, an oil channel 51 extends along a center axis of the compressible insert forming a fluid path connecting the receiving space and the oil inlet, and hence allowing oil to be filled in the pulse unit.

Figure 2B:
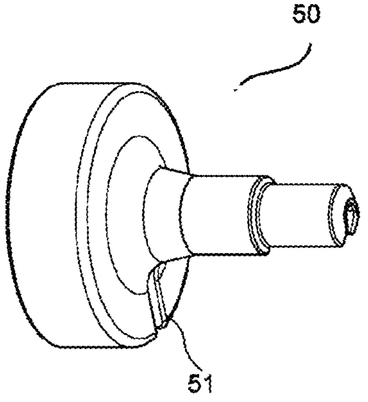
FIG. 2*b* is a perspective view of an exemplary compressible element according to one embodiment.

FIG. 2*b* shows the insert in detail in a perspective view. As may be seen the insert has an overall rotationally symmetric design, disregarding the slit 51 provided to facilitate assembly. The shape of the compressible insert 50 (and hence of the congruent space 60) is in the illustrated embodiment further chosen to achieve an insert as large as possible while minimize the impact on the operation of the pulse unit. This by giving the insert an elongated shape, where a varying radius R2 of the rotationally symmetric insert 50 is kept low in order to minimize the impact on stressed areas of the end piece as well as the impact on inertia.

In the illustrated embodiment, the volume of the compressible insert 50 is approximately 15% of the total combined volume of the oil chamber and receiving space (corresponding to the total volume of oil in the system in use)—this allows for a relatively small deformation when the oil expands, in turn ensuring a more or less completely elastic deformation of the insert (i.e. no permanent deformation occurs).

The illustrated insert is made from a closed foam material, in the exemplary case polyvinyl fluoride.

Figure 3A:
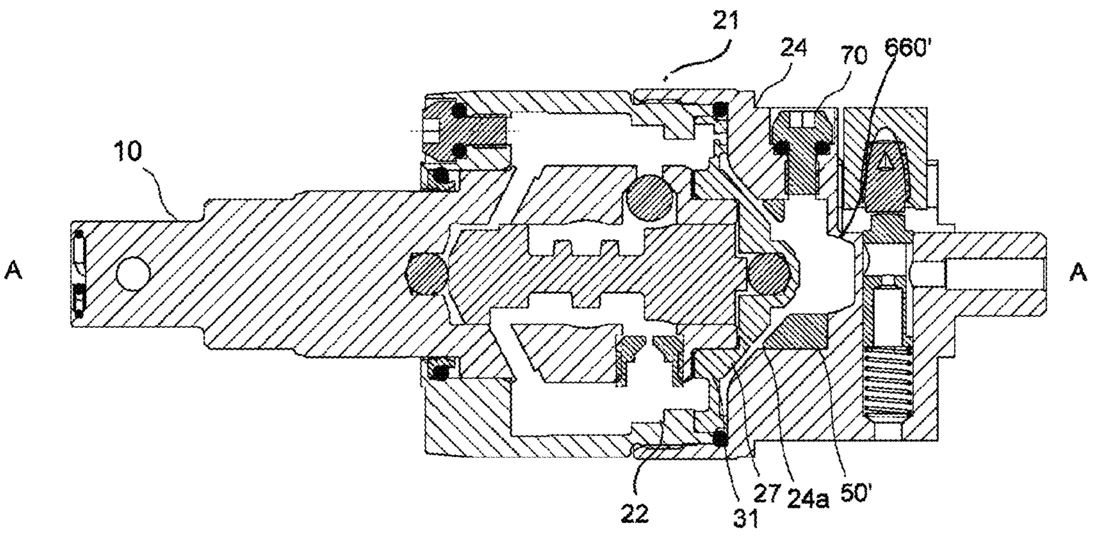
FIG. 3*a* is a cross sectional view of a hydraulic pulse unit according to one embodiment.
Figure 3B:
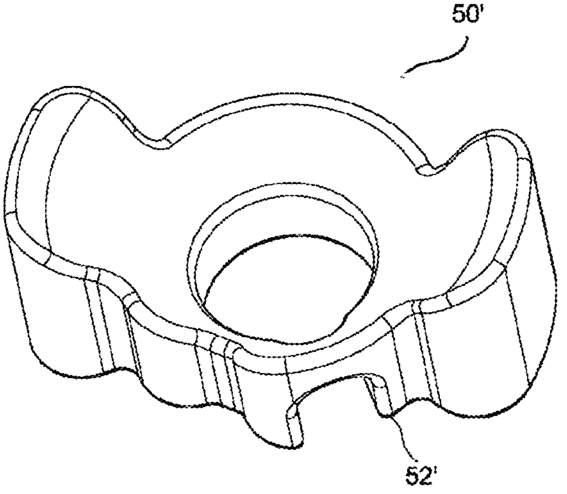
FIG. 3*b* is a perspective view of an exemplary compressible element according to one embodiment.

A second embodiment of the invention is illustrated in FIGS. 3*a*-3*b*. Similarly to the first embodiment, an insert space 60' is arranged adjacent to the receiving space 27, and a compressible insert 50' is arranged in this insert space 60'.

In this exemplary embodiment, the insert space extends over most of the end piece 24, but not quite reaching the rear end wall 24*b*. The compressible insert, in an unstressed state, also in this illustrated embodiment fills the whole insert space.

FIG. 3*b* shows the insert 50' in detail in a perspective view. Contrary to the insert shown in FIG. 2*b*, the insert 50' is not rotationally symmetric illustrating a different approach to achieve an insert as large as possible while minimize the impact on the operation of the pulse unit. This by reducing the amount of material on a larger distance from the center of the insert as much as possible. A notch, or recess 52', forming an oil channel in this case extending in a direction perpendicular to a center axis of the insert. This to allow a flow of oil through the inlet 50' from the oil inlet 71'.

During operation of the impulse unit the inertia drive member 21 is rotated by the motor and a torque impulse is accomplished in the output shaft 10. As the oil heats up and expansion occurs, some oil will enter from the oil chamber 22 via a fluid opening (not shown) into the receiving space 27, resulting in compression of the compressible insert 50; 50' in the adjacent insert space 60; 60'. As the tool halts however, the oil cools off and the compressible insert may expand back to its uncompressed state.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims. In the claims, the word “comprising” does not exclude other elements or steps and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. An impulse tool comprising a motor, an output shaft, and a hydraulic pulse unit including an inertia drive member connected to the motor and rotatable about a rotation axis, an oil chamber enclosed in the inertia drive member and an impulse generating means arranged to transfer intermittently kinetic energy to the output shaft, wherein the inertia drive member further comprises an end piece having a transverse wall, said impulse tool further comprising a disc shaped separator element arranged to at least partly delimit a receiving space in fluid communication with said oil chamber by means of an opening provided in the disc shaped separator element through which oil may flow between the oil chamber and the receiving space, the receiving space being formed between the disc shaped separator element and the transverse wall, wherein said impulse tool further comprises a compressible insert arranged in fluidic communication with said receiving space, wherein the compressible insert comprises a foam body comprising a closed cell foam, and wherein said compressible insert is arranged in an insert space formed in said end piece, wherein said insert space is arranged adjacent to said receiving space, wherein said insert space extends between said receiving space and an oil inlet formed in said end piece, and wherein an oil channel is formed in said compressible insert, said oil channel forming a fluid path fluidly connecting said receiving space and said oil inlet to allow a flow of oil to pass through a portion of said compressible insert, wherein the oil inlet is externally accessible, and wherein said oil channel is sized to receive oil from an external source via the oil inlet and to thereby fill the receiving space with oil.

2. The impulse tool according to claim 1, wherein said insert space extends in an axial direction from said receiving space over at least two-thirds of the length of said end piece.

3. The impulse tool according to claim 1, wherein an outer boundary surface of the compressible insert and the insert space are congruent, such that the compressible insert in an uncompressed state fills the whole insert space.

4. The impulse tool according to claim 1, wherein said oil channel is an oil channel for filling said pulse unit with oil, the oil channel extending along a center axis of said compressible insert.

5. The impulse tool according to claim 1, wherein said oil channel is an oil channel for filling said pulse unit with oil, the oil channel extending in a direction perpendicular to a center axis of said compressible insert.

6. The impulse tool according to claim 1, wherein the compressible insert is rotationally symmetric with respect to a center axis of the pulse unit and wherein a radius of said compressible insert is less than or equal to half of a radius of said end piece along the length of the insert chamber.

7. The impulse tool according to claim 6, wherein at least one of said radius of said compressible insert and said varying radius of said end piece is/are varying along the length of the insert chamber.

8. The impulse tool according to claim 1, wherein the volume of the insert lies in the range 10-30% of a combined total volume of said oil chamber and said receiving space.

9. The impulse tool according to claim 8, wherein the volume of the insert lies in the range 10-25% of said combined total volume.

10. The impulse tool according to claim 8, wherein the volume of the insert lies in the range 10-20% of said combined total volume.

11. The impulse tool according to claim 8, wherein the volume of the insert lies in the range 10-15% of said combined total volume.

12. The impulse tool according to claim 1, wherein said closed cell foam is a foam material which can withstand 20-50% compression without permanent deformation.

13. The impulse tool according to claim 1, wherein the cell diameter of the closed cell foam lies in the range 0.15-0.35 mm.

14. The impulse tool according to claim 1, wherein the gas fraction of the cell foam lies in the range 85-99%.

15. The impulse tool according to claim 1, wherein the closed cell foam is made of polyvinyl fluoride.

16. The impulse tool according to claim 1, wherein said closed cell foam is a foam material which can withstand 20-30% compression without permanent deformation.

17. The impulse tool according to claim 1, wherein said closed cell foam is a foam material which can withstand 22-27% compression without permanent deformation.

18. The impulse tool according to claim 1, wherein the cell diameter of the closed cell foam lies in the range 0.2-0.3 mm.

19. The impulse tool according to claim 1, wherein the cell diameter of the closed cell foam lies in the range 0.25-0.28 mm.

* * * * *